US010384876B2

(12) United States Patent
Pieters (10) Patent No.: US 10,384,876 B2
(45) Date of Patent: Aug. 20, 2019

(54) DEVICE AND METHOD FOR LATERALLY GUIDING CONTAINERS

(71) Applicant: KHS GmbH, Dortmund (DE)

(72) Inventor: Sebastian Pieters, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/761,522

(22) PCT Filed: Aug. 29, 2016

(86) PCT No.: PCT/EP2016/070297
§ 371 (c)(1),
(2) Date: Mar. 20, 2018

(87) PCT Pub. No.: WO2017/050526
PCT Pub. Date: Mar. 30, 2017

(65) Prior Publication Data
US 2019/0055090 A1 Feb. 21, 2019

(30) Foreign Application Priority Data
Sep. 21, 2015 (DE) .......................... 10 2015 115 906

(51) Int. Cl.
B65G 47/32 (2006.01)
B65G 47/24 (2006.01)
B65G 15/62 (2006.01)
B65G 21/20 (2006.01)
B65G 47/08 (2006.01)

(52) U.S. Cl.
CPC ......... *B65G 21/2054* (2013.01); *B65G 15/62* (2013.01); *B65G 21/2072* (2013.01); *B65G 47/24* (2013.01); *B65G 47/32* (2013.01); *B65G 47/082* (2013.01); *B65G 2201/0244* (2013.01)

(58) Field of Classification Search
None
See application file for complete search history.

(56) References Cited

U.S. PATENT DOCUMENTS

| 2,912,093 | A | | 11/1959 | Lauck | |
|---|---|---|---|---|---|
| 3,227,260 | A | * | 1/1966 | Graves | ................... A01K 43/00 198/457.07 |
| 3,363,741 | A | | 1/1968 | Dierksheide | |
| 4,479,582 | A | | 10/1984 | Ducloux | |
| 4,883,163 | A | * | 11/1989 | Gamberini | ............. B65G 47/32 198/377.04 |
| 5,261,207 | A | * | 11/1993 | Bedin | ................... B67C 7/0046 198/480.1 |
| 6,745,890 | B2 | * | 6/2004 | Nickey | ................ B65G 47/847 198/379 |

(Continued)

FOREIGN PATENT DOCUMENTS

DE        600 04 299        6/2004
DE    10 2007 001 535        7/2008
(Continued)

*Primary Examiner* — Kavel Singh
(74) *Attorney, Agent, or Firm* — Occhiuti & Rohlicek LLP (57) ABSTRACT

A container-guiding apparatus for guiding containers along an arcuate path includes a concave guide-region and a guide belt that forms a resting region for containers to laterally guide containers along the path. The guide belt, which is driven to endlessly circulate, applies feed forces to the containers to force them along the transport direction.

20 Claims, 4 Drawing Sheets

(56) References Cited

U.S. PATENT DOCUMENTS

| | | |
|---|---|---|
| 6,874,615 B2 | 4/2005 | Fallas |
| 7,494,003 B2 | 2/2009 | Giometti et al. |
| 8,328,004 B2 | 12/2012 | Balk |

FOREIGN PATENT DOCUMENTS

| | | |
|---|---|---|
| DE | 10 2012 100 810 | 6/2013 |
| FR | 2 809 100 | 11/2001 |
| FR | 2 672 876 | 12/2013 |
| KR | 101 380 231 | 4/2014 |
| WO | WO2012/076659 | 6/2012 |
| WO | WO2014/196862 | 12/2014 |

\* cited by examiner

DEVICE AND METHOD FOR LATERALLY GUIDING CONTAINERS

RELATED APPLICATIONS

This application is the national stage, under 35 USC 371, of international application PCT/EP2016/070297, filed on Aug. 29, 2016, which claims the benefit of the Sep. 21, 2015 priority date of German application DE 10-2015-115-906.6, the contents of which are herein incorporated by reference.

FIELD OF INVENTION

The invention relates to container processing, and in particular, to guiding containers.

BACKROUND

It is known to convey containers so that they can be grouped into a pack of containers. Such conveying often includes a container-handling module shaped like an arc of a circle. This module interacts with containers moving along a linear transport path. A guide rail is used in connection with this transfer.

A difficulty with using a guide rail is the transfer process can be unstable. In particular, sometimes the container rotates as it is transferred. This rotation matters a great deal. Downstream processing may require containers in a particular orientation. For example, in some cases, adhesive must be applied to containers to join them with other containers. If the container's orientation is uncontrolled, this adhesive may be placed in an inappropriate location, such as on a label or on an embossed container feature.

SUMMARY

Among the objects of the invention is that of promoting container transfer without rotating the containers.

According to a first aspect, the invention relates to a device for guiding containers along an arcuate container-transport path. The device comprises a concavely shaped, i.e. inwardly curved, guide region in which the containers are laterally guided. Opposite this guide region lies a rotating transport element by way of which the containers are moved forward in the transport direction in interaction with the guiding device. A guide belt forms a resting region for the containers in the guide region in order to guide them laterally along the arcuate container-transport path. The guide belt is provided in the region of the concave guide region. The guide belt is also driven to revolve endlessly and is configured to apply, to the containers, feed forces acting in the transport direction of the containers. Thus the container is moved not only one-sidedly by the transport element interacting with the guiding device, but feed forces also act on the container on opposite sides.

An essential advantage of the inventive container-handling device is that a twisting of the container about its vertical container axis is effectively prevented by the applying of feed forces to sides lying opposite one another. This is of decisive benefit especially when containers are bonded to one another by way of adhesive points since a twist-free transfer to the grouping device ensures that the adhesive points come to lie in the desired position and meet up with one another exactly. Furthermore, the driving of the guide belt brings about an active lateral guiding, as a result of which a rubbing of the container against for example a stationary guide rail or other passive lateral guide, and hence damage to sensitive container surfaces such as for example labels, imprints etc., is effectively avoided.

According to one embodiment, the guide belt comprises a base region configured in the manner of a strap, and a resting region which projects away from the base region. When viewed in the direction of the region in which the containers are moved, the resting region projects out laterally from the base region and with its face lying opposite the base region forms a resting surface for the containers. Through the selected form of the guide belt it is possible to achieve a guiding of the guide belt along the concavely curved guide region with a simultaneous lateral guiding of the containers by way of said guide belt.

According to one embodiment, the resting region is formed by a plurality of block-like resting elements which are provided distributed along the loop-like guide belt and project laterally away from the base region. The front faces of the resting elements each form resting surfaces for the containers that are to be guided laterally. The block-like resting elements achieve a structuring of the resting surface for the containers such that the transmission of feed forces to the containers is improved.

According to one embodiment, two resting elements respectively which are adjacent to or which succeed one another are arranged at a distance from one another. In other words the resting elements that succeed each other are separated from one another by incisions with no spacing, i.e. they lie next to one another in a non-curved orientation, or are separated from one another by minimal gaps. This ensures that the guide belt can be flexibly bent and/or deformed both at the very tight deflection points (convex shaping of the guide belt) and in the region of the concave guide region.

In the case of embodiments with large deflection radii, a one-piece resting element can be provided all around the belt without the afore-mentioned incisions and/or gaps.

According to one embodiment, the resting region and the base region are formed from different materials. In particular, the resting region is formed from a softer material than the base region. The resting region is preferably formed from an elastic polyurethane (PUR) material, in particular Sylomer®. As a result, the material of the base region and of the resting region can be appropriately selected for the respective tasks which these regions have to perform.

According to one embodiment, the base region projects out above and/or below from the resting region so as to form a guide edge. By way of this guide edge the guide belt can be suitably guided along the concavely curved guide region, for example by way of a guideway or similar.

According to one embodiment, one or a plurality of guide clamps are provided which encompass at least sections of the guide edge. The guide clamps preferably comprise a guide slot which is dimensioned such that the guide edge of the guide belt can be inserted into the guide slot so as to form a guide-way. Thus the guide belt can be guided along the concavely curved guide region independently of the presence of containers to be conveyed.

According to one embodiment, the guide clamps are provided in pairs, with a first guide clamp of the guide clamp pair gripping an upper guide edge and a second guide clamp of the guide clamp pair gripping a lower guide edge. The guiding of the guide belt can be further improved by the upper and lower guide clamps.

According to one embodiment, at least two pairs of guide clamps are provided on the concavely curved guide region. A more flexible adaptation of the device to transport elements which interact with the device can be achieved by the provision of a plurality of guide clamps along the guide region.

According to one embodiment, means are provided for adjusting the curvature of the concave guide region. As a result of this, the guide region of the device can be adapted to suit transport elements having different curve contours and/or curvature radii and which interact with the device.

According to one embodiment, the guide clamps are adjustable in a direction square to the transporting direction in order to adjust the curvature of the guide region. For example, an adjuster mechanism, in particular an adjuster mechanism comprising a cam, can be provided, with the adjuster mechanism being configured to displace the guide clamps square to the direction of motion of the guide belt and so to increase or reduce the curvature radius of the guide belt or its distance from the transport element lying opposite it.

According to one embodiment, two concave guide regions are provided on each of which one or more guide belts circulate, with the guide regions being configured for the lateral bringing together of two container streams; in particular the container streams are each single-track container streams, so that a two-row container stream is obtained by the action of bringing together. This is particularly advantageous with container-handling devices in which two-row container packs are formed. A lateral guiding of two container streams that are separate from one another can therefore be simultaneously achieved by way of a single device.

According to a further aspect, the invention relates to a container-handling device having a container-transport path, with at least one transport element that can be driven to rotate about a vertical axis of rotation being provided at a first section of the container-transport path and by way of which the containers are moved on an arcuate transporting path, and with a linearly conveying transport element being provided at a second section of the container-transport path. A guiding and feeding device which comprises a concave guide region is provided in the transitional region between the first section and the second section of the container-transport path. The guiding and feeding device comprises a guide belt which forms a resting region for the containers in the concave guide region in order to guide them laterally along an arcuate container-transport path. The guide belt is also driven to endlessly revolve in order to apply feed forces acting in the transporting direction to the container. The container-handling device is in particular a device for producing container packs in which the containers are bonded to one another.

According to one embodiment, the guiding and feeding device is height-adjustable in configuration. The guide belt can therefore be displaced to different heights and so adapted to suit different container formats and/or container heights.

According to one embodiment, the container-handling device is constructed mirror-symmetrically in order to handle containers in multiple single-row container streams. Here, the guiding and feeding device is also constructed mirror-symmetrically and is configured to bring together the containers of multiple single-row container streams. Thus containers can be brought together in the correct vertical and rotational position so as to form a two-row container stream, for example.

According to one embodiment, the guiding and feeding device interacts with one or a plurality of transport elements lying opposite the at least one guide belt, with the at least one transport element being driven synchronously with the guide belt. In the process, feed forces are applied to the container by the guide belt on a first side and by the at least one transport element on a side lying opposite the first side. An unwanted rotating of the container about its vertical container axis can be prevented by the application of force on both sides.

According to a further aspect the invention relates to a method for guiding containers along an arcuate container-transport path.

Here, in a concave guide region the containers are guided along the arcuate container-transport path lying against a guide belt driven to revolve endlessly, and feed forces are applied to the containers by way of the guide belt.

The term "container" in the sense of the invention is used to refer to all kinds of packaging, and in particular bottles, cans etc.

The term "guide belt" is used to refer to segmented and non-segmented belts, in particular including link belts.

For the purpose of the invention the expressions "substantially" or "around" mean variations from the respective exact value by ±10%, preferably by ±5% and/or variations in the form of changes insignificant for the function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained below in greater detail through the use of embodiment examples with reference to the figures.

DETAILED DESCRIPTION

Figure 1:
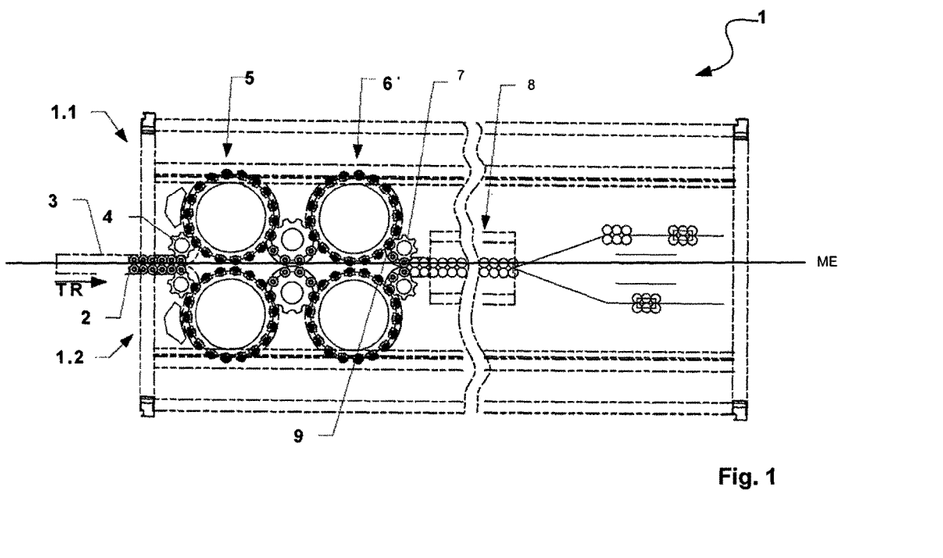
FIG. 1 is a plan view of a container-handling machine comprising a plurality of handling modules and a downstream handling unit.

FIG. 1 shows an embodiment of a container-handling device 1 for producing multi-row packs of containers 2 by bonding containers 2 to one another. The illustrated container-handling device 1 simultaneously processes two single-row container streams. However, the principles described herein are also applicable to container-handling devices 1 that process a single one-row container stream, as well as to container-handling devices 1 in which a lateral guiding of the containers 2 moved in a transporting direction along an arcuate container-transport path is required.

Figure 3:
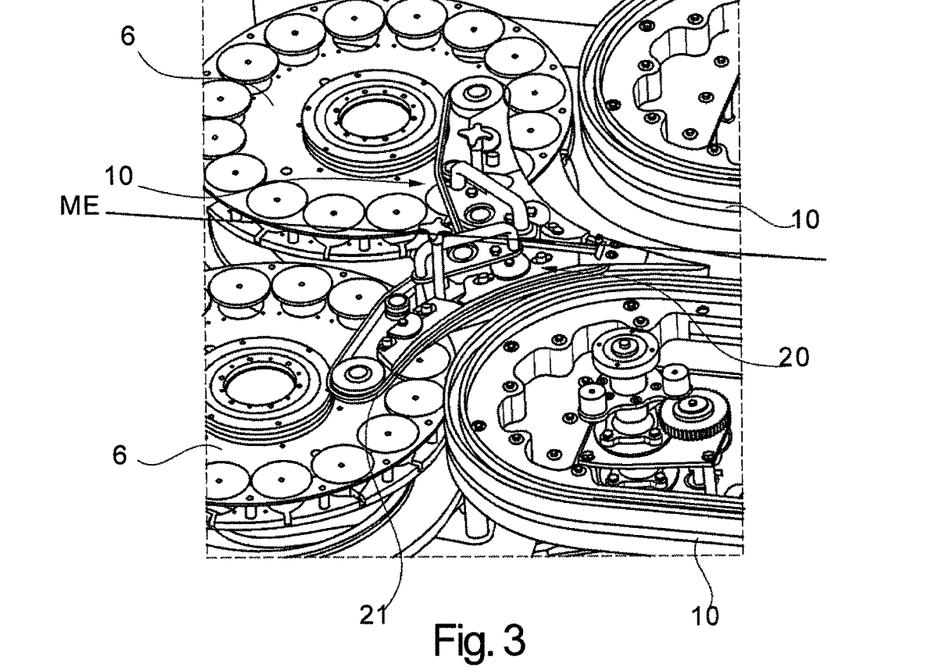
FIG. 3 is a perspective view of a transitional region between a handling module and a downstream handling unit of a container-handling machine.

The container-handling device 1 has mirror-symmetry about a median plane ME that bisects the middle of the structure shown in FIG. 1, as can be seen in FIG. 3. A first processing region 1.1 lies on one side of the median plane ME and a second processing region 1.2 lies on the other side of the median plane ME. The first and second processing regions 1.1, 1.2 operate counter to one another. Accordingly, only the first processing region 1.1 is described in detail since the same description is applicable to the second processing region 1.2.

A conveyor 3 transports standing containers 2 along a transport direction TR and feeds them to an inlet star 4. Plural container-handling modules 5, 6 lie downstream of the inlet star 4. Each container-handling module 5, 6 has a rotor that can be driven to rotate about a vertical axis.

In some embodiments, the first container-handling module 5 is an orienting module that orients the containers according to a container feature and the second container-handling module 6 is a sealing module that seals open containers. In other embodiments, the second container-handling module 6 applies adhesive onto the container's outer surface so as to permit the subsequent connection of containers 2 by bonded connections, thus creating container packs.

The second container-handling module 6 feeds the containers 2 to an outlet star 7, which forwards the containers 2 to a handling unit 8. In some embodiments, the handling unit 8 is a grouping device that forms container packs having two or more rows of containers.

In the region of the handling unit 8, a conveyor belt or chain moves the containers along a line. However, in the regions of the first and second container-handling modules 5, 6, the containers move along an arcuate path. the arcuate path has at least one arcuate section.

There are several ways to transfer containers 2 from the arcuate path to the linear path In the embodiment shown in FIG. 1, an outlet star 7 has recesses, or "container pockets" distributed around its periphery. These recesses partially accommodate containers 2 that are to be transferred from the handling module 6 to the handling unit 8 and, during rotation thereof, feed the containers 2 to the handling unit 8.

A guide rail 9 provided in sections around the outlet star 7 prevents a container 2 from swinging radially out of a recess. As the container slides along the guide rail 9, the guide rail 9 guides it radially. This changes the container's direction of motion, for example, within a range between 90° and 130°, after which the containers 2 are appropriately fed to the linear transport path in the region of the handling unit 8.

Figure 2:
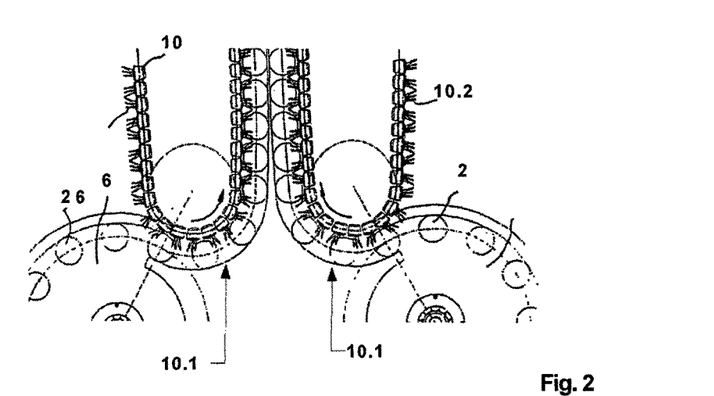
FIG. 2 is a plan view of another embodiment of a transitional region between a handling module and a downstream handling unit of a container-handling machine.

FIG. 2 shows a further embodiment of a transitional region between the handling module 6 and the handling unit 8. In this embodiment, the containers 2 are transferred directly from the handling module 6 to a continuously driven transport belt 10, with the transfer taking place in a deflection region 10.1 of the transport belt 10. The deflection region 10.1 of the transport belt 10 assures the transfer of the containers 2 to the linear transport path in a manner comparable with the previously described outlet star 7. The transport belt 10 also causes subsequent linear onward transport of the containers 2 by the handling unit 8.

The transport belt 10 comprises flexible fingers 10.2 that project out from the transport belt 10 at right angles to the transport direction of the containers 2 and at right angles to the vertical container axis of a container 2. These fingers 10.2 act as drivers for the containers 2.

In this embodiment, the deflection region 10.1 supplies containers 2 from the arcuate path to the linear path. During this process, the fingers 10.2 feed the containers 2 forward.

A guide rail 9 prevents containers 2 from being flung out radially. It does so by hindering movement of containers 2 away from the transport belt 10 and thus preventing the containers 2 from being disengaged from the fingers 10.2.

FIG. 3 shows another embodiment of a transitional region between the handling module 6 and the handling unit 8. In this embodiment, a guiding and feeding device 20, hereafter referred to as a "guiding feeder," is disposed in the transitional region between the handling module 6 and the transport belt 10. The guiding feeder 20 laterally guides containers and also provides the force necessary to feed the containers forward. In some embodiments, the transport belt 10 is configured as described in FIG. 2. Other embodiments omit the transport belt 10. In such embodiments, an outlet star 7 interacts with the guiding feeder 20.

The guiding feeder 20 is preferably configured to have mirror symmetry relative to the median plane ME. Such mirror symmetry enables the guiding feeder 20 to feed the handling unit 8 containers 2 from both the first and second processing regions 1.1, 1.2. A first half of the guiding feeder 20 interacts with the handling module 6 of the first processing region 1.1 and a second half of the guiding feeder 20 interacts with the handling module 6 of the second processing region 1.2. Only one branch of the guiding feeder 20 is described below because the description of the other half would be the same.

Figure 4:
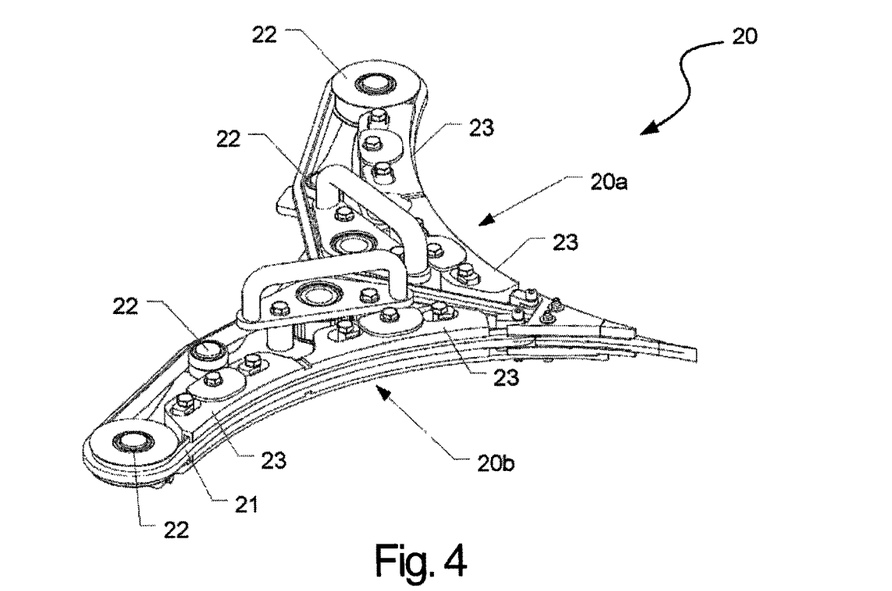
FIG. 4 is a perspective view of a guiding and feeding device.
Figure 5:
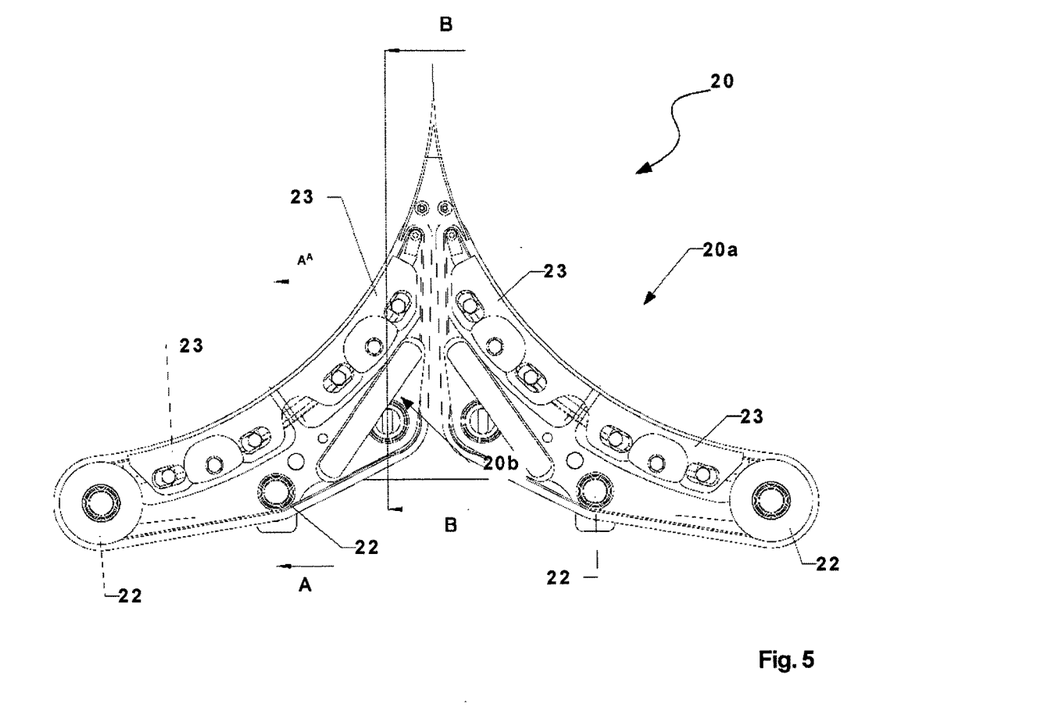
FIG. 5 is a perspective plan view of the guiding and feeding device of FIG. 4.

Referring to FIG. 4, the guiding feeder 20 comprises first and second concave guide region 20*a*, 20*b* that are used for lateral guiding of containers 2. A moving guide belt 21 provides the feed forces needed for lateral guiding. The guide belt 21 moves along the first and second concave guide region 20*a*, 20*b*.

The guide belt 21 is preferably driven synchronously with a transport element lying opposite the guide regions 20*a*, 20*b*. Examples of such transport elements include the transport belt 10 and the outlet star 7. As used herein, "synchronously" means that the speed at which the guide belt 21 moves matches the speed at which the transport element that lies opposite the guide belt 21 moves. As a result, the container 2 does not twist about its vertical container axis as it is being guided.

FIGS. 4 to 7 show the guiding feeder 20 in different depictions and in greater detail.

Each half of the guiding feeder 20 comprises a guide belt 21 configured like a loop. The guide belt 21 can be configured as a strap or also as a belt having multiple members. Guide rollers 22 along the guide belt's transport path deflect and vertically guide the guide belt 21. Tension in the guide belt 21 comes from a tensioning device, such as a tensioning pulley whose position can be adjusted to adjust the tension. In some embodiments, the tensioning pulley is one to which a spring force is applied.

A motorized drive drives the guide belt 21. Preferably, the drive is an electromotor drive whose speed can be precisely regulated. This permits the guide belt 21 to be driven at a precise speed so that it can be synchronized with a transport element with which it interacts, such as the transport belt 10 or the outlet star 7.

Guide clamps 23 form a guide-way to guide the guide belt 21 along the concave guide regions 20*a*, 20*b*. The illustrated embodiment has a pair of guide clamps 23, with a first guide clamp encompassing upper sections of the guide belt 21 and a second guide clamp 23 encompassing lower sections of the guide belt 21.

Figure 6:
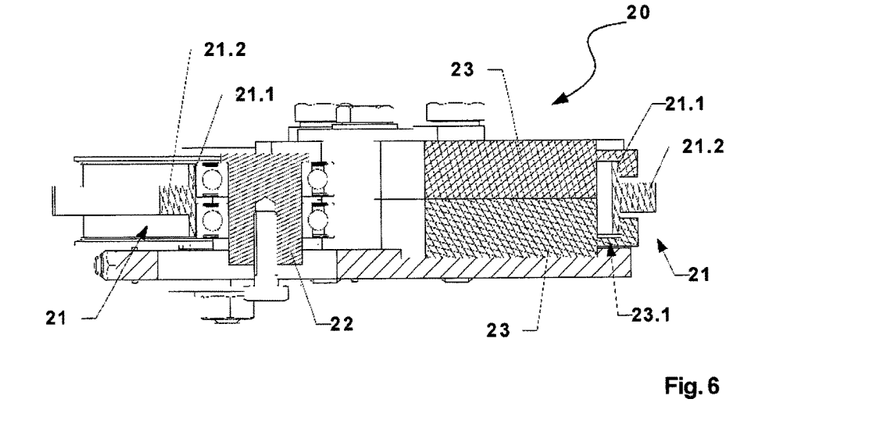
FIG. 6 is a sectional view of the guiding and feeding device of FIG. 5 along section line A-A.
Figure 7:
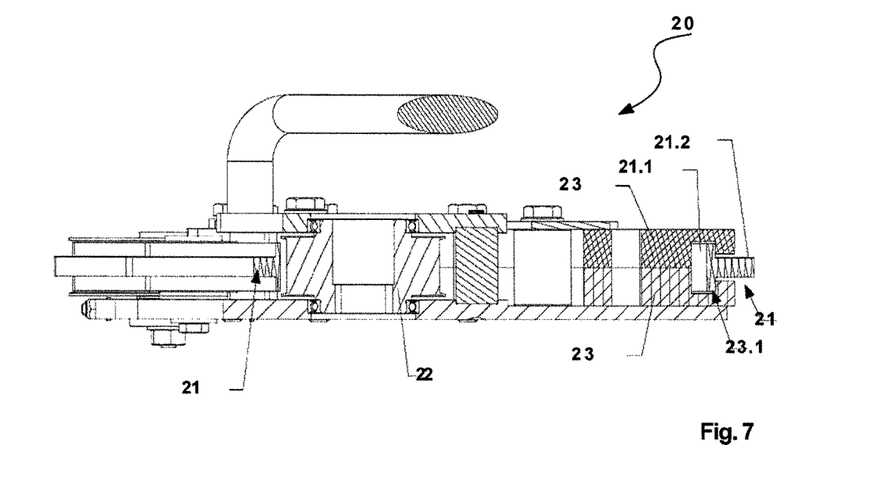
FIG. 7 is a sectional view of the guiding and feeding device of FIG. 5 along section line B-B.

As can be seen from the sectional views in FIGS. 6 and 7, the guide clamps 23 include a guide slot 23.1 that laterally guides an edge of the guide belt 21. The guide slot 23.1 is curved to guide the guide belt 21 along the concave guide region 20a, 20b. A plurality of pairs of guide clamps 23 can be provided along the guide region 20a, 20b to guide the guide belt 21.

In the particular embodiment shown, one or more cams permit the guide clamps 23 to be adjustable along a direction at right angles to the direction of the guide belt's motion. This permits adapting the radius-of-curvature of the guiding feeder 20 for different applications, for example to interact with transport elements having different geometric properties, such as different radii.

The guiding feeder 20 can also be provided on the container-handling device 1 so as to be entirely adjustable. In some embodiments, the guiding feeder 20 is height-adjustable. This permits the guiding feeder 20 to to process containers that have different heights. In other embodiments, the guiding feeder 20 is displaceable along a direction parallel to the linear transporting direction in the region of the handling unit 8, as indicated by the double arrow in FIG. 3. This permits the guiding feeder 20 to process different container diameters as a result. In yet other embodiments, the guiding feeder 20 is adjustable in both directions so that it can be used to process containers with both different heights and different diameters.

Figure 8:
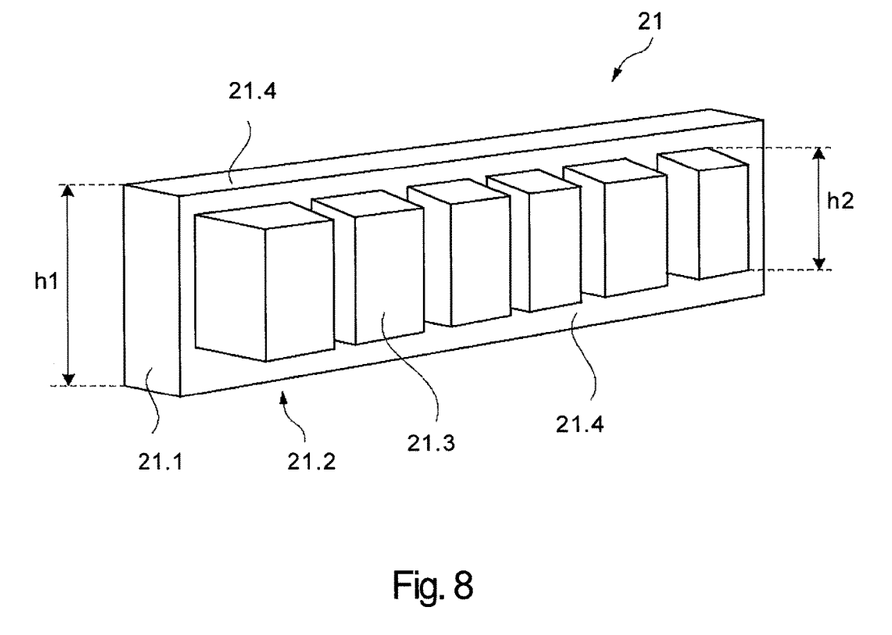
FIG. 8 is a perspective view of a guide belt.

FIG. 8 shows a schematic cutaway view of a guide belt 21.

The guide belt 21 comprises a plurality of differently shaped regions. These include a base region 21.1, and a resting region 21.2 that projects away from the base region 21.1. The base region 21.1 is preferably like a loop or a self-contained belt region by way of which the guide belt 21 can be tensioned and through which driving forces can be transmitted to the guide belt 21. In the illustrated embodiment the base region 21.1 has a rectangular or substantially rectangular cross-section. Alternatively the base region can have a wedge-shaped cross-section or a tapered cross-section.

In the illustrated embodiment the resting region 21.2 comprises block-like resting elements 21.3 arranged in succession in one or more rows along the transport direction. As shown, the resting elements 21.3 are spaced apart or with a gap between them. The gaps can be formed, for example, by incisions in the resting region 21.3. These gaps prevent the guide belt's flexibility from being restricted significantly by the resting elements 21.3 or by the resting region 21.2.

Preferably, different materials form the base region 21.1 and the resting region 21.2. In some embodiments, the harder of two materials forms the base region 21.1 and the softer of two materials forms the resting region 21.2. In some embodiments, polyurethane forms the base region 21.1 and a mixed-line PUR elastomer (polyether urethane), in particular a SYLOMER®, forms the resting region 21.2. This means that the respective regions of the guide belt 21 can be appropriately adapted to their tasks. The base region 21.1 promotes the guide belt's ability to maintain different tensions. Meanwhile, the resting region 21.2 gently transmits feed forces to the containers 2.

As shown in FIG. 8, the base region has a first height h1 and the resting region has a second height h2. The first height h1 is preferably greater than the second height h2. This creates upper and lower guide edges 21.4 on the guide belt 21. The guide edges 21.4 are preferably configured in such a way that they can be introduced into the guide slot 23.1 of the guide clamp 23. this creates a guide belt 21 with a T-shaped cross-section. Interaction of the guide edge 21.4 with the guide slot 23.1 thus achieves guiding of the guide belt 21 along the concave guide region 20a, 20b.

In the preceding embodiments, the guiding feeders 20 have two concave guide regions with mirror symmetry. However, it is also possible to have an asymmetric embodiment in which the guiding feeder 20 has only a single concave guide region for interacting with a single transport element that is driven to rotate. Examples of such a transport element again include the outlet star 7 and the transport belt 10.

Having described the invention, and a preferred embodiment thereof, what is new and secured by Letters Patent is:

1. An apparatus for guiding a container along a path, wherein said path comprises an arcuate container-transport path, wherein said apparatus comprises a guide region and a guide belt, wherein said guide region is a concave guide-region that comprises at least a concave portion of said guide belt, wherein said guide belt forms a resting region for said container in said guide region to laterally guide said container along said path, and wherein said guide belt is driven to endlessly circulate so as to apply, to said container, a feed force acting in a transport direction, wherein said guide belt comprises a base region and a resting region, wherein said base region comprises a strap, and wherein said resting region projects away from said strap.

2. The apparatus of claim 1, further comprising means for adjusting a curvature of said concave guide-region.

3. The apparatus of claim 1, further comprising guide clamps that define a curved guide slot that laterally guides said concave portion of said guide belt along said concave guide-region.

4. The apparatus of claim 1, further comprising a container-handling device, wherein, within said container-handling device, said path comprises a first section, a second section, and a transitional section between said first and second sections, wherein said container-handling device comprises a guiding feeder, a rotor, and a linearly-conveying transport element, wherein said rotor is at said first section, wherein said rotor moves said container along said path, wherein said linearly-conveying transport element is at said second section, wherein said guiding feeder is disposed at said transitional section, and wherein said guiding feeder comprises said guide belt.

5. An apparatus for guiding a container along a path, wherein said path comprises an arcuate container-transport path, wherein said apparatus comprises a guide region and a guide belt, wherein said guide region is a concave guide-region that comprises at least a concave portion of said guide belt, wherein said guide belt forms a resting region for said container in said guide region to laterally guide said container along said path, and wherein said guide belt is driven to endlessly circulate so as to apply, to said container, a feed force acting in a transport direction, wherein said guide belt comprises a strap and blocks that project away from said strap.

6. The apparatus of claim 5, wherein said guide belt comprises a resting region upon which containers rest while being guided along said path and a base region that supports said resting region, wherein said resting region is formed from a first material, wherein said base region is formed from a second material, and wherein said first material is softer than said second material.

7. The apparatus of claim 5, further comprising a container-handling device, wherein, within said container-handling device, said path comprises a first section, a second section, and a transitional section between said first and second sections, wherein said container-handling device comprises a guiding feeder, a rotor, and a linearly-conveying transport element, wherein said rotor is at said first section, wherein said rotor moves said container along said path, wherein said linearly-conveying transport element is at said second section, wherein said guiding feeder is disposed at said transitional section, and wherein said guiding feeder comprises said guide belt.

8. The apparatus of claim 7, wherein said guiding feeder is height adjustable.

9. The apparatus of claim 7, wherein container-handling device has mirror symmetry for handling multiple container streams, wherein said guiding feeder has mirror symmetry, and wherein said guiding feeder is configured to bring multiple container streams together.

10. The apparatus of claim 7, wherein said guiding feeder interacts with a transport element that lies opposite said guide belt and wherein said transport element and said guide belt are driven synchronously.

11. An apparatus for guiding a container along a path, wherein said path comprises an arcuate container-transport path, wherein said apparatus comprises a guide region and a guide belt, wherein said guide region is a concave guide-region that comprises at least a concave portion of said guide belt, wherein said guide belt forms a resting region for said container in said guide region to laterally guide said container along said path, and wherein said guide belt is driven to endlessly circulate so as to apply, to said container, a feed force acting in a transport direction, wherein said guide belt comprises a base region and a resting region, wherein as a result of a height difference between said base region and said resting region, an edge of said base region projects beyond said resting region, wherein said edge forms a guide edge.

12. The apparatus of claim 11, further comprising guide clamps, wherein said guide clamps encompass at least sections of said guide edge.

13. The apparatus of claim 12, wherein said guide clamps are provided in pairs, wherein, as a result of a height difference between said base region and said resting region, a first edge of said base region projects beyond said resting region in a first direction and a second edge of said base region projects beyond said resting region in a second direction, said second direction being opposite said first direction, wherein said first edge forms an upper guide-edge, wherein said second edge forms a lower guide-edge, wherein a first guide clamp of said pair grips said upper guide-edge, and wherein a second guide clamp of said pair grips said lower guide-edge.

14. The apparatus of claim 12, wherein said guide clamps comprise two pairs of guide clamps, wherein said guide clamps form a guide-way to guide said guide belt along said concave guide-region.

15. The apparatus of claim 11, wherein said guide clamps are adjustable in a direction at right angles to said transport direction and wherein a curvature of said guide region is adjustable by said guide clamps.

16. An apparatus for guiding a container along a path, wherein said path comprises an arcuate container-transport path, wherein said apparatus comprises a guide region and a guide belt, wherein said guide region is a concave guide-region that comprises at least a concave portion of said guide belt, wherein said guide belt forms a resting region for said container in said guide region to laterally guide said container along said path, and wherein said guide belt is driven to endlessly circulate so as to apply, to said container, a feed force acting in a transport direction, said apparatus further comprising concave guide regions, wherein each guide region comprises a guide belt that circulates, and wherein said guide regions are configured to bring together two container streams to form a third container stream that comprises two rows of containers.

17. The apparatus of claim 16, wherein said guide belt comprises a base region and adjacent blocks, wherein said blocks are arranged in succession along a row in said transport direction, wherein said base region extends across gaps that exist between adjacent blocks.

18. The apparatus of claim 16, wherein said guide belt comprises a resting region upon which containers rest while being guided along said path and a base region that supports said resting region, wherein said resting region is formed from an elastic polyurethane material.

19. The apparatus of claim 16, wherein said guide belt has a T-shaped cross section.

20. The apparatus of claim 16, further comprising a container-handling device, wherein, within said container-handling device, said path comprises a first section, a second section, and a transitional section between said first and second sections, wherein said container-handling device comprises a guiding feeder, a rotor, and a linearly-conveying transport element, wherein said rotor is at said first section, wherein said rotor moves said container along said path, wherein said linearly-conveying transport element is at said second section, wherein said guiding feeder is disposed at said transitional section, and wherein said guiding feeder comprises said guide belt.

* * * * *